United States Patent
Didas

[15] 3,647,051
[45] Mar. 7, 1972

[54] FAST ADJUSTMENT DEVICE FOR CONVEYOR GUIDE RAILS

[72] Inventor: Ronald E. Didas, Dansville, N.Y.
[73] Assignee: Stone Conveyor Co., Inc.
[22] Filed: May 26, 1970
[21] Appl. No.: 40,560

[52] U.S. Cl. ............................................................198/204
[51] Int. Cl. ....................................................B65g 15/60
[58] Field of Search ..............................198/204; 24/243 Q

[56] References Cited

UNITED STATES PATENTS 3,368,666  2/1968  Stone.....................................198/204
1,505,220  8/1924  Shay.....................................24/343 Q

*Primary Examiner*—Richard E. Aegerter
*Attorney*—Clarence A. O'Brien and Harvey B. Jacobson

[57] ABSTRACT

Side rails are mounted over a conveyor. Each rail is connected to perpendicularly oriented rods that are slidably disposed in spring-retainer clamps. By selectively releasing the clamps, the rods may be longitudinally adjusted to position an associated side rail into close proximity with the outward contour of a conveyed article.

7 Claims, 4 Drawing Figures

PATENTED MAR 7 1972 3,647,051
Fig. 1
Fig. 2
Fig. 3
Fig. 4
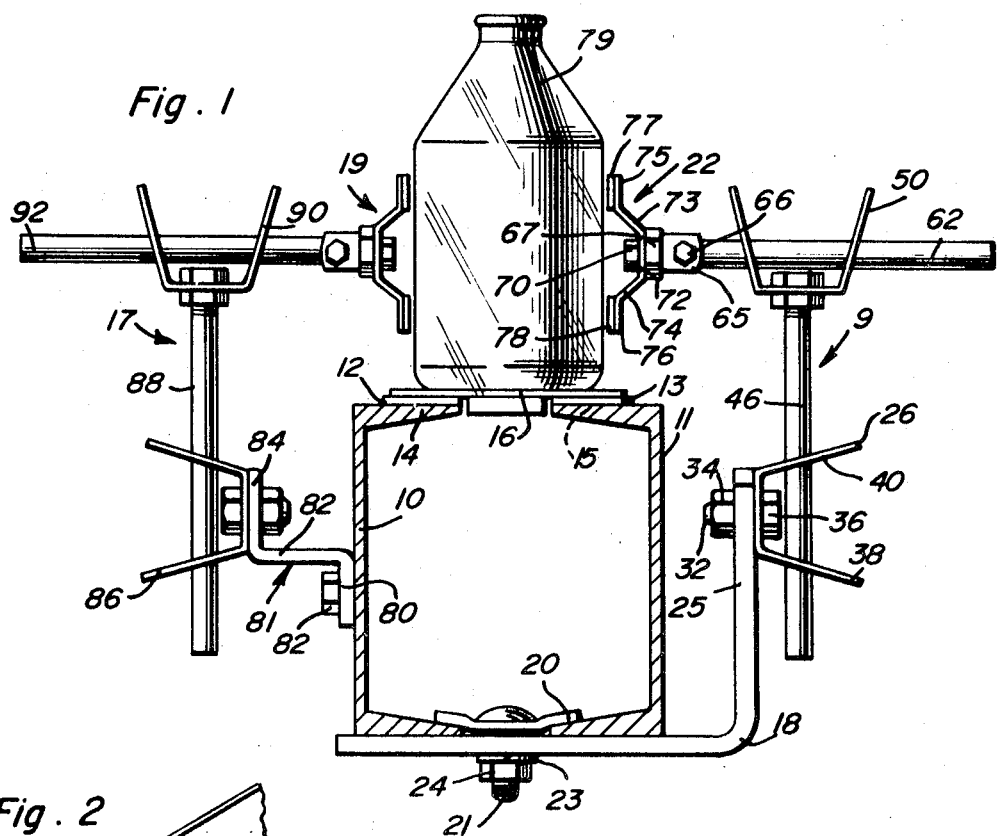
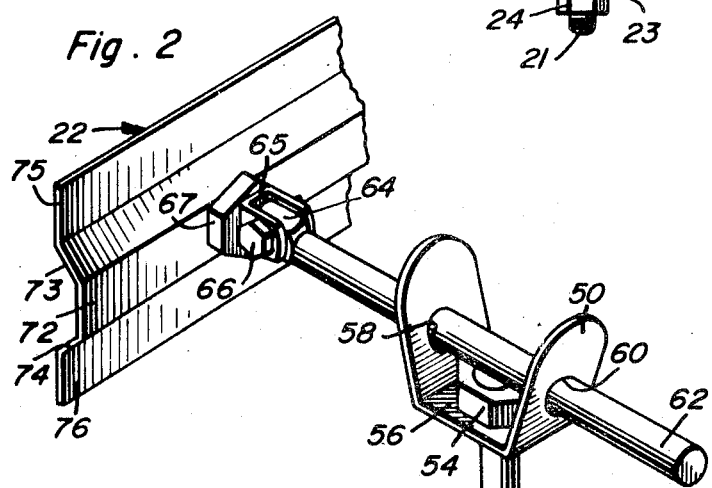
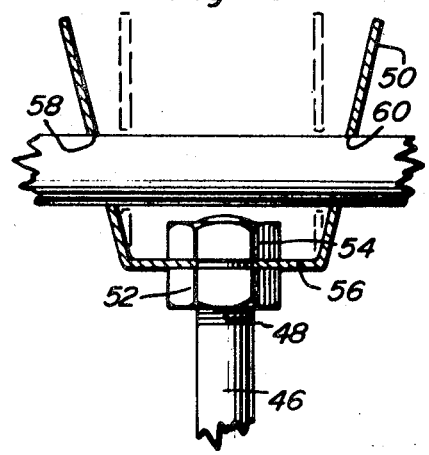
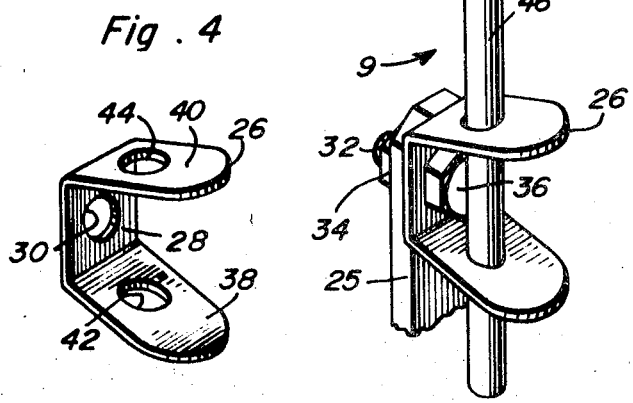
Ronald E. Didas
INVENTOR.
BY Clarence A. O'Brien
and Harvey B. Jacobson
Attorneys

FAST ADJUSTMENT DEVICE FOR CONVEYOR GUIDE RAILS

The present invention pertains to a machine for conveying articles along a predetermined path and more particularly to means for adjustably mounting side rails above the machine.

Due to the irregular or odd-shaped nature of certain articles or containers, such as bottles or the like, conveyor machinery must be specially designed to ensure that the articles will remain on a moving conveyor when the latter operates at a moderate speed. In the past, side rails have been placed in close proximity with the traveling articles so that their lateral displacement is restricted.

When transferring conveyed articles from one conveyor to another by conventional means such as a transferring disc or by moving the article along curved sections of a conveyor, the speed at which the mechanism is allowed to operate is an important factor and at these points, the guiding side rails are normally employed for maintaining the articles in proper position on the conveying portion of the mechanism. In the past, adjusting means have been attached to the side rails so that the side rails may be properly positioned in close proximity with selected portions of the conveyed articles. Guiding means including the adjustable feature is disclosed in U.S. Pat. No. 3,280,962, which issued to Stone on Oct. 25, 1966. It is the express purpose of the present invention to define an improvement in the adjustable feature of the guiding means disclosed in that patent.

The Stone patent discloses means for adjustably mounting the side rails which include threaded members secured in mounting brackets. When an adjustment of the side rail positions is desired, the threaded members are adjusted with the use of tools until the side rails reside in a desired position. As will be appreciated, the adjustment procedure can be time consuming and result in expensive conveyor mechanism downtime until all the adjustments along the length of the entire conveying mechanism have been properly made.

Further, the Stone patent sets forth a cam assembly that connects the side rails to the threaded members of the adjustment assembly. The cam assembly is desirable because it allows the side rails to be tilted thereby ensuring a greater degree of conformance between the side rails and the contour of the conveyed article.

The improvement of the present invention simplifies the adjustments disclosed in the Stone patent and permits adjustment of the individual adjustment assemblies in a relatively short period of time which reduces the downtime of the conveying mechanism.

Instead of threaded members employed in the Stone device, the present invention includes rodlike support members that are interconnected by spring-retaining clips. In order to change the relative disposition of the rods which in turn changes the position of the side rails, all that is required is the exertion of finger pressure on the retainer clips which allows sliding displacement of the rods.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an end view, partially in section, of a conveying mechanism showing the guide rails and the adjustment mechanism associated therewith according to the present invention.

FIG. 2 is a partial perspective view illustrating the adjustment assembly in detail.

FIG. 3 is an elevational view illustrating the relationship between various components of the adjustment assembly.

FIG. 4 is a perspective view of a spring-retainer clip as employed in the adjustment assembly.

Referring to the figures and more particularly FIG. 1, a conveyor bed is illustrated which includes conventional opposing channel members 10 and 11 having wear-resistant strip members 12 and 13 attached to the upper surfaces thereof by means of countersunk screw fasteners 14 and 15, respectively. A conveyor member of the tabletop type is employed to move a handled article along a predetermined path, the conveyor member being identified by reference numeral 16.

Side guide rails 19 and 22 are disposed above the conveyor bed and are adapted to be positioned in close proximity to the body of the conveyed article. As illustrated in FIG. 1, by way of example, the conveyed article is illustrated as a bottle. The side rails are adjustably mounted on adjustment assemblies 9 and 17.

With regard to the adjustment assembly 9, an L-shaped mounting bracket 18 includes a first flange portion disposed in underlying relation with the underside of the channel members 10 and 11. The means of attaching bracket 18 includes a bolt anchor 20 disposed within the conveyor bed and formed to seat at the lower portion thereof intermediate the channel members 10 and 11. The bolt anchor is provided with a centrally disposed aperture which is adapted to receive a bolt 21 that extends downwardly through the conveyor bed. A washer 23 and nut 24 assemble on bolt 21 for attaching the mounting bracket 18 securely to and in abutting relation to the lower side of the channel members 10 and 11.

The outward end of the L-shaped bracket 18 extends vertically in the form of a flange 25 which serves to mount a releasable generally U-shaped spring clamp 26. The structure of clamp 26 is more particularly shown in FIG. 4 to include a web portion 28 having an aperture 30 formed therein. The aperture is positioned in alignment with an aperture formed in the upper end of flange 25 thereby allowing passage of a bolt 32 through these apertures. A nut 34 is slipped over the free end of bolt 32 while an integrally formed head 36 characterizes the opposite end of bolt 32. By tightening nut 34 against a confronting face of flange 25, the bolt head 36 clamps the web 28 of clamp 26 against flange 25. The clamp includes two winglike flanges 38 and 40 which are positioned in diverging alignment. The flanges 38 and 40 include centrally formed apertures 42 and 44, respectively, to allow passage of a vertical rod 46 therethrough. The upper end of the rod is threaded (48) and mounts a nut 52 which serves as an abutment for a second releasable clamp 50. A second nut 54 is mounted on the threaded end of the rod and clamps the web 56 of clamp 50 against the lower disposed nut 52. Apertures 58 and 60 are formed in the wing flange portions of the clamp and therefore complete a clamp structure identical with clamp 26 aforementioned. As in the case of the clamp 26, the flanges usually flex outwardly so that the aperture walls in the wing flanges frictionally engage rod 62 that horizontally passes through the horizontally aligned apertures 42 and 44 in the flanges. As indicated in phantom in FIG. 3, when the wing flanges are pressed inwardly under the influence of digital pressure, the wing flanges will assume a parallel relationship and the oversized apertures in the wing flanges will have their axes disposed in alignment thereby allowing the clamp to slide relative to rod 62. This sliding motion adjusts the position of the associated side rail 22.

In FIG. 2, the connection between side rail 22 and rod 62 is clearly shown. As will be noted from an investigation of the figure, the inner end of rod 62 includes a head portion 64 enclosed by a U-shaped clevis 65 that is pivotally mounted with respect to head 64 by means of a pivot pin 66. The outer edge of the clevis 65 is suitably attached to a nut member 67. As indicated in FIG. 1, a nutlike fastener 70 clamps the side rail 22 against the nut 67. By loosening pivot pin 66, clevis 65 can be tilted to effect a preselected tilt position of the side rail 22.

Considering FIG. 2, the particular structure of a typical guide rail will be seen to include a web portion 72 extending outwardly to angular inclined flanges 73 and 74. These latter-mentioned flanges extend to vertically disposed outward flanges 75 and 76 which mount wear-resistant strips 77 and 78, respectively. These wear strips are placed in close proximity to preselected portions of the article 79 being conveyed.

A second adjusting assembly 17 is substantially the same as that explained in connection with assembly 9. However, if desired, the mounting bracket 18 may be replaced by a second Z-shaped mounting bracket 81 having a first vertically oriented flange 80 attached to channel member 10 by means of a suitable threaded fastener 82. The central web 82 of the bracket extends outwardly to a third and final vertical flange 84 which mounts a releasable clamp 86 that is identical to the aforementioned clamps 26 and 50. The clamp 86 serves the same function and is operated in the same manner as clamp 26. Thus, clamp 86 is employed to adjustably support rod 88 which terminates upwardly in a connection for attaching a fourth releasable clamp 90 that is identical to the other mentioned clamps. Clamp 90 slidably receives support rod 92 which serves the same function as the aforementioned rod 62. Thus, by properly positioning rod 88 with respect to its associated clamp 86, the vertical position of side rail 19 will be determined. By suitably adjusting the position of rod 92 with respect to clamp 90, the horizontal position of the side rail 19 will be determined. The side rail 19 is adapted for tilting due to its pivotal connection to rod 92, which pivotal connection is constructed in an identical manner to that previously described in connection with side rail 22.

When adjustment of the positions of the side rails 19 and 22 is required, the vertical positions thereof may be altered by adjusting rods 46 and 88 with respect to clamps 26 and 86, respectively. As previously mentioned, this adjustment is made by squeezing the winged flanges of the clamps together as illustrated in phantom in FIG. 3. When the horizontal location of the side rails is to be altered, a similar adjustment in clamps 50 and 90 is made thereby allowing sliding of rods 62 and 92. This of course results in the horizontal adjustment of the side rails 19 and 22.

As will be appreciated, adjustment of side rail position is easily effected by simply squeezing the illustrated clamps and sliding the received rods as required. No special tools are needed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a conveyor system for conveying articles along a predetermined path laterally bounded by article guiding side rails, an adjustable assembly for the side rails comprising a plurality of mounting brackets, first releasable spring clamps connected to the brackets, vertical rod members engaged by the first spring clamps, the vertical rod members being adjustably slidable in the first spring clamps to achieve selected vertical positions, second releasable spring clamps connected to the vertical rod members, horizontal rod members engaged by the second spring clamps, the horizontal rod members being adjustably slidable in the second spring clamps to achieve selected horizontal positions, and means connecting the inner ends of the horizontal rod members to the side rails, whereby adjustment of the rod members results in disposition of the side rails in close proximity to the conveyed article.

2. The structure of clam 1 wherein the first and second clamps each comprises a central web portion and winged flanges diverging outwardly from the web portion, generally aligned apertures being formed in the winged flanges to frictionally engage a rod member therein whereby application of digital pressure to the winged flanges causes the winged flanges to assume parallel positions thereby freeing engagement between the winged flanges and the rod members.

3. The structure of claim 2 wherein the means connecting the inner ends of the horizontal rod members to the side rails are pivotally attached to the inner rod member ends, and fastener means securing an associated side rail to the pivot means whereby adjustment of the pivot means varies the inclination of the side rail relative to its associated rod member.

4. The structure set forth in claim 3 wherein the pivot means comprises a clevis pivotally mounted to the inner end of an associated horizontal rod member.

5. The structure set forth in claim 4 wherein the brackets each includes a vertical flange extending upwardly for termination below the moving member, the upper end of each vertical flange having an aperture formed therein, and fastening means disposed in the aperture for securing the first mentioned releasable spring clamps to the vertical flange.

6. In a conveyor system for conveying articles along a predetermined path laterally bound by an article guiding side rail, an adjustably assembly for the side rails comprising at least one mounting bracket, a first releasable spring clamp, connected to the bracket, vertical rod members engaged by the first spring clamp, the vertical rod member being adjustably slidable in the clamp to achieve selected vertical positions, a second releasable spring clamp connected to the vertical rod member, a horizontal rod member engaged by the second spring clamp, the horizontal rod member being adjustable with respect to the second spring clamp to achieve selected horizontal positions, and means connected the end of the horizontal rod member to the side rail, whereby an adjustment of the rod members results in disposition of the side rail in close proximity to the conveyed article.

7. In a conveyor system for conveying articles along a predetermined path laterally bounded by article guiding side rails, an adjustable assembly for the side rails comprising a plurality of mounting brackets, first supporting means connected to the brackets, vertical rod members engaged by the supporting means, the vertical rod members being adjustably slidable in the supporting means to achieve selected vertical positions, releasable spring clamps connected to the vertical rod members, horizontal rod members engaged by the spring clamps, the horizontal rod members being adjustably slidable in the clamps to achieve selected horizontal positions, and means connecting the inner ends of the horizontal rod members to the side rails, whereby adjustment of the rod members results in disposition of the side rails in close proximity to the conveyed article.

* * * * *